United States Patent
Zhou et al.

(10) Patent No.: US 9,438,505 B1
(45) Date of Patent: Sep. 6, 2016

(54) SYSTEM AND METHOD FOR INCREASING CAPACITY IN ROUTER FORWARDING TABLES

(75) Inventors: Junlan Zhou, Sunnyvale, CA (US); Zhengrong Ji, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 1077 days.

(21) Appl. No.: 13/434,094

(22) Filed: Mar. 29, 2012

(51) Int. Cl.
*H04L 12/701* (2013.01)
*H04L 12/935* (2013.01)
*H04L 12/801* (2013.01)
*H04L 12/743* (2013.01)

(52) U.S. Cl.
CPC ........... *H04L 45/00* (2013.01); *H04L 45/7457* (2013.01); *H04L 47/10* (2013.01); *H04L 49/3009* (2013.01)

(58) Field of Classification Search
None
See application file for complete search history.

(56) References Cited

U.S. PATENT DOCUMENTS

| | | | |
|---|---|---|---|
| 6,862,281 B1 * | 3/2005 | Chandrasekaran | 370/392 |
| 7,043,494 B1 * | 5/2006 | Joshi et al. | G06F 17/30961 |
| 7,986,696 B1 * | 7/2011 | Miliavisky et al. | 370/392 |
| 2007/0280258 A1 * | 12/2007 | Rajagopalan et al. | 370/395.3 |
| 2011/0038375 A1 * | 2/2011 | Liu et al. | 370/392 |

* cited by examiner

*Primary Examiner* — Ian N Moore
*Assistant Examiner* — Brian T Le
(74) *Attorney, Agent, or Firm* — McDermott Will & Emery LLP

(57) ABSTRACT

A multi-stage TCAM may include a plurality of tables on a pipeline and may store flow rules, including a key, an action, and a priority. The flow rule's key, which may consist of a number of bits, may be divided into several buckets. For each bucket, a hardware table on the multi-stage TCAM may be created. The first bucket may be used as a lookup key to the first table, and an output from this first table may be used as a lookup key to the next table on the pipeline. Because the full flow key need not be stored in a single TCAM table, a capacity of the TCAM can be maximized with its width minimized.

21 Claims, 10 Drawing Sheets

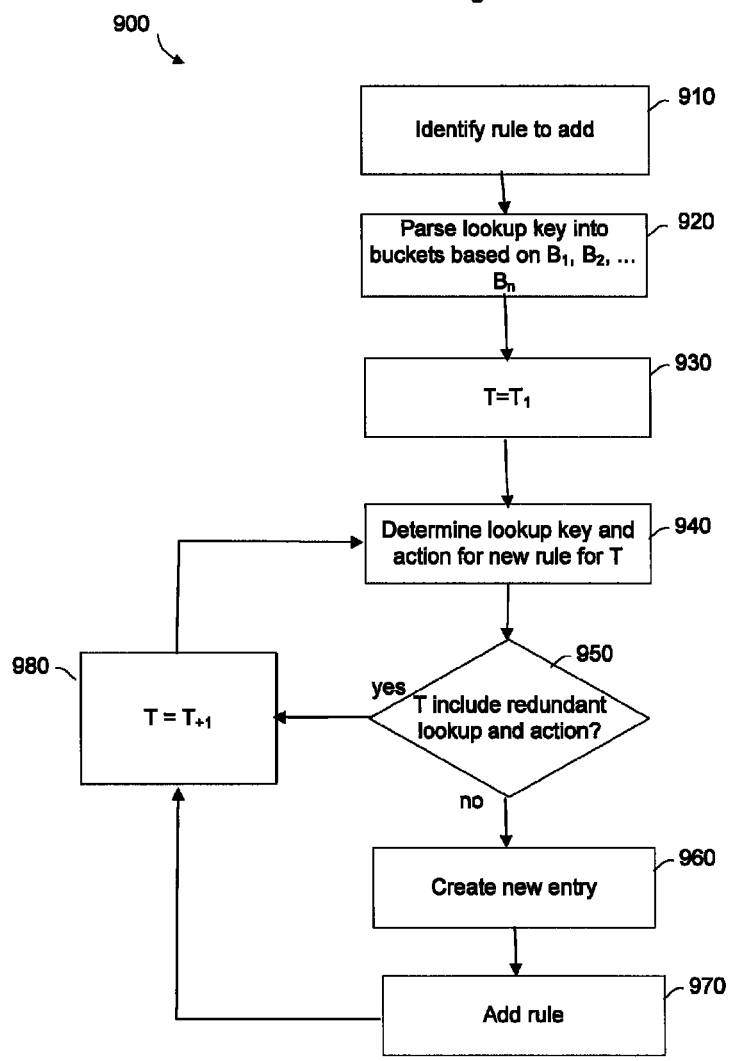

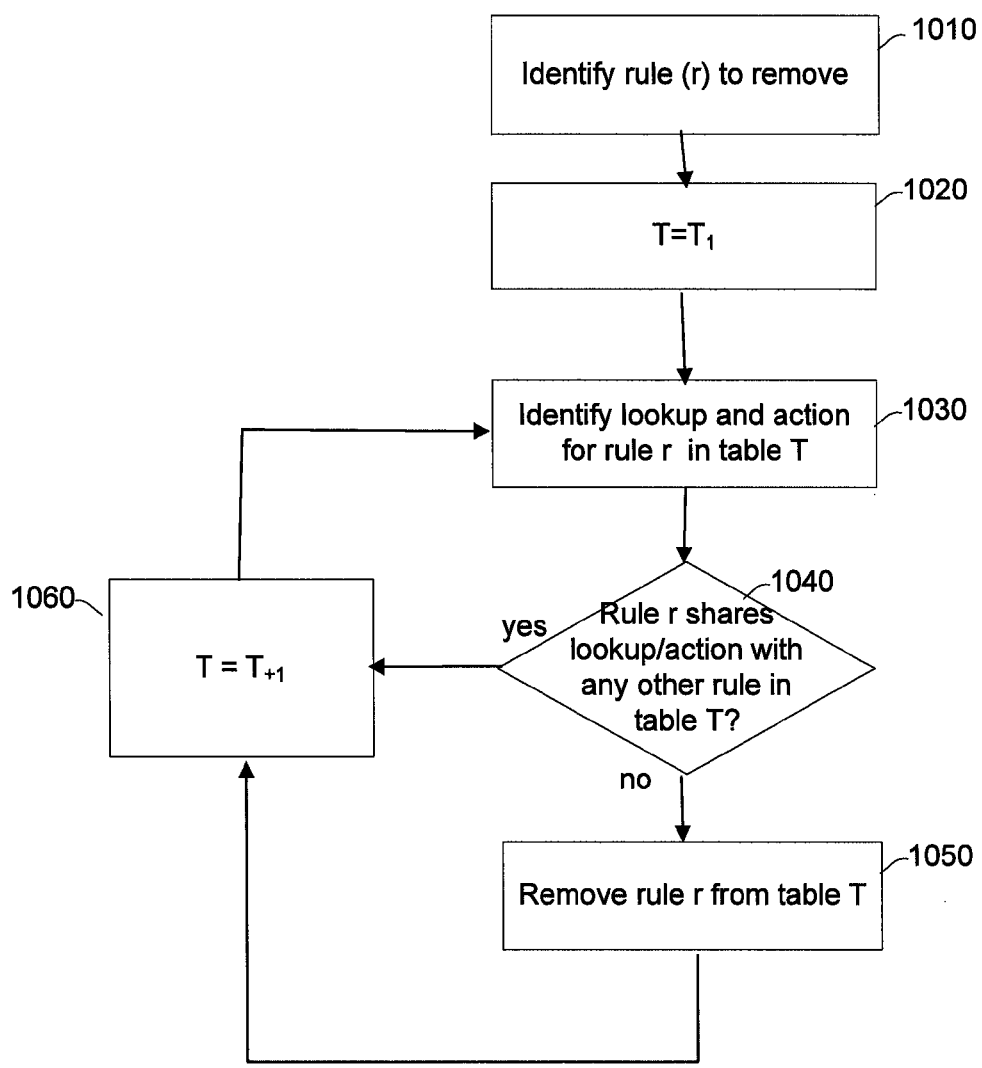

SYSTEM AND METHOD FOR INCREASING CAPACITY IN ROUTER FORWARDING TABLES

BACKGROUND OF THE INVENTION

A Ternary Content Addressable Memory ("TCAM") is a type of computer memory used in certain high speed searching applications, such as routing information through a network. It is designed such that it receives a data word (e.g., a key in a packet header) and performs parallel matches of that word against every entry in the TCAM in a single clock cycle. Each TCAM entry can store a flow rule comprising a key, an action, and a priority.

TCAMs have been widely used in routers, switches, and network security appliances of high speed networks to implement packet flow rules, e.g., access control list ("ACL") call rules. They may be used for various applications, including packet filtering, forwarding, traffic load balancing and shaping. However, TCAMS may be very costly and may consume a significant amount of power. Accordingly, TCAMs are often small and do not scale well to large networks using thousands of flow rules.

TCAMs are often used in network routers. TCAMs may have variable widths, where the width is inversely proportional to a capacity of the TCAM. For example, a TCAM may support 1000 entries of 72 bits, 512 entries of 144 bits, or 256 entries of 288 bits. Traditionally, a router programs each flow rule (comprising a key, priority, and an action) into one TCAM entry, and configures the width of the TCAM to be the maximum width of flow key. This results in minimal capacity of the TCAM.

Some chip hardware includes a pipeline of tables. The pipeline of tables may be used to perform a multi-stage look-up of packets, in which the result of one table lookup is used as part of lookup key to the next table in the pipeline. For instance, Broadcam chips support a 3-stage pipeline: VFP (Virtual local area network Field Processor), IFP (Ingress Field Processor), and EFP (Egress Field Processor): VFP generates an VRF; (VRF_id, dst_ip, dst_port, . . . ) is matched against IFP, which produces (egress_port, egress_mod_id); (egress_port, src_ip, dst_ip, . . . ) is matched against EFP. Similarly, Dune Networking chips support a 4-stage pipeline: AC classification table (generating VRF_id), LPM (Longest Prefix Match), IFP-stage-1 (using (FEC_id, src_ip, dst_ip, etc.) as the lookup key), IFP-stage-2, and EFP.

SUMMARY OF THE INVENTION

One aspect of the technology provides a method of building a multi-stage router forwarding table, the method comprising parsing a flow key into a plurality of buckets, using a processor, wherein each of the plurality of buckets includes one or more bits of the flow key, creating a plurality of tables in a memory, each of the plurality of buckets corresponding to one of the plurality of tables and each of the plurality of tables including one or more entries, wherein the plurality of tables are linked in a pipeline, and populating, using the processor, an entry in each of the plurality of tables in the pipeline with a lookup key and a corresponding output, the lookup key comprising an output from a preceding table and the bits from the bucket corresponding to the table. A last one of the plurality of tables in the pipeline may include an action for forwarding a data packet. Widths of one or more of the plurality of tables may be reduced according to variety of different methods.

Parsing the flow key into the plurality of buckets may comprise determining a minimum configurable width of a last one of the plurality of tables in the pipeline, identifying sets of bits in the flow key as candidates for a last bucket, and determining whether any of the candidate sets of bits, when combined with an output from a preceding table, have a combined width less than the minimum configurable width of the last table in the pipeline. If a given candidate set of bits, when combined with the output from the preceding table, has a combined width less than the minimum configurable width of the last table in the pipeline, the given candidate set of bits may be grouped into the last bucket. If no candidate set of bits, when combined with the output from the preceding table, has a combined width less than the minimum configurable width of the last table in the pipeline, then a next smallest configurable width of the last table may be determined, and it may be further determined whether any of the candidate sets of bits, when combined with the output from the preceding table, have a combined width less than the next smallest configurable width of the last table in the pipeline.

Another aspect of the technology provides a method for increasing capacity in a router forwarding table, comprising implementing one or more multi-stage TCAMs in a memory, the one or more multi-stage TCAMs comprising a plurality of tables linked in a pipeline, an input for each table in the pipeline including an output from a preceding table and a set of bits from a flow key, and an output for a last of the plurality of tables in the pipeline comprising an action for forwarding a data packet. The method may further comprise reducing, using a processor, a width of the one or more multi-stage TCAMs. Reducing the width of the one or more multi-stage TCAMs may comprise reducing a width of the output from the preceding table and reducing a width of the set of bits from the flow key, reducing a number of different outputs in the table, and reducing a number of bits used to represent the different outputs in the table, and/or aggregating two or more flow rules having different keys and the same output into one flow rule. This reducing may be performed periodically.

Yet another aspect of the technology provides a router, comprising a storage area storing one or more multi-stage TCAMs, the one or more multi-stage TCAMs comprising a plurality of tables linked in a pipeline, an input for each table in the pipeline including an output from a preceding table and a set of bits from a flow key, and an output for a last of the plurality of tables in the pipeline comprising an action for forwarding a packet. The multi-stage TCAMs may further comprise an input adapted to receive packets including routing information, and a processor configured to sequentially match portions of the routing information against each of the plurality of tables linked in the pipeline, and forward the packet based on the action in the last table in the pipeline.

BRIEF DESCRIPTION OF THE DRAWINGS

FIG. 9 illustrates a method of adding a rule to a TCAM according to an aspect of the technology.

FIG. 10 illustrates a method for deleting a rule from the router according to an aspect of the technology.

DETAILED DESCRIPTION

A multi-stage TCAM may include a plurality of tables on a pipeline and may store flow rules, including a key, an action, and a priority. The flow rule's key, which may consist of a number of bits, may be divided into several buckets. For each bucket, a hardware table on the multi-stage TCAM may be created. The first bucket may be used as a lookup key to the first table, and an output from this first table may be used as a lookup key to the next table on the pipeline. For example, a lookup key to the first table ($T_1$) may be the first bucket ($B_1$), and a corresponding action may be output1. The lookup key to the next table ($T_2$) may be (output$_1$, $B_2$), and so on, until the last table ($T_N$), which has a lookup key of (output$_{N-1}$, $B_N$). Because the full flow key need not be stored in a single TCAM table, a capacity of the TCAM can be maximized with its width minimized.

Figure 1:
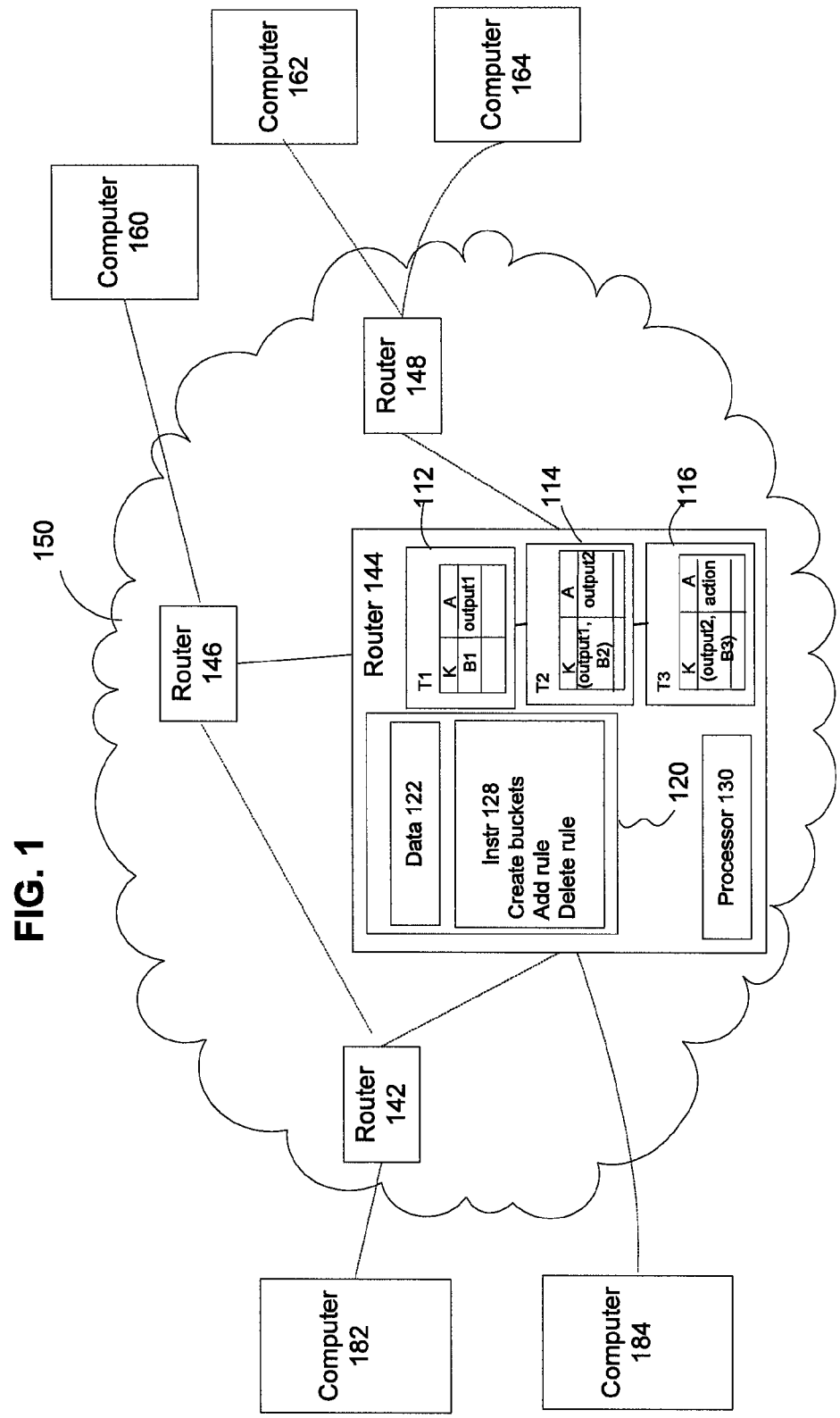
FIG. 1 is a system diagram according to an aspect of the technology.

FIG. 1 illustrates an exemplary network 150 that joins a plurality of client computers 160, 162, 164, 182, 184. The network 150 includes a plurality of routers 142, 144, 146, 148. Each router may include a processor 130 and a memory 120 coupled to the processor 130. Each router 142-148 may further include one or more input ports for receiving data from other routers or computing devices, such as packets or program updates. Similarly, each router 142-148 may have one or more output ports for transmitting data through the network 150.

Each router 142-148 may also include one or more packet forwarding tables, some or all of which may be multi-staged. For example, in the router 144, TCAM 110 includes tables 112, 114, and 116. Further, each router may have a processor and a memory, such as memory 120 of the router 144, which stores data 122 and instructions 128 (e.g., for populating multi-stage TCAMs, adding rules, deleting rules, etc.). While the TCAM 130 is shown as being stored separately from memory 120, it should be understood that the TCAM 110, data 122, and instructions 128 may all be stored in the same medium.

The memory 120 stores information accessible by processor 130, including instructions 128, and data 122 that may be executed or otherwise used by the processor 130. The memory 120 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 128 may be any set of instructions to be executed directly (such as machine code) or indirectly (such as scripts) by the processor 130. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 122 may be retrieved, stored or modified by processor 130 in accordance with the instructions 128. For instance, although the system and method is not limited by any particular data structure, the data may be stored in computer registers, in a relational database as a table having a plurality of different fields and records, XML documents or flat files. The data may also be formatted in any computer-readable format. The data may comprise any information sufficient to identify the relevant information, such as numbers, descriptive text, proprietary codes, references to data stored in other areas of the same memory or different memories (including other network locations) or information that is used by a function to calculate the relevant data.

The processor 130 may be any conventional processor, such as processors in commercially available routers. Alternatively, the processor may be a dedicated controller such as an ASIC or other hardware-based processor. The processor and memory may actually comprise multiple processors and memories that may or may not be stored within the same physical housing. For example, memory may be a hard drive or other storage media located in a server farm of a data center. Accordingly, references to a processor, memory, or computer will be understood to include references to a collection of processors, memories or computers that may or may not operate in parallel.

The computers 160, 162, 164, 182, 184 may be any of a variety of computing devices, including personal digital assistants (PDAs), laptops, tablet PCs, netbooks, PCs, etc. These devices may be connected to the network 150 via a wired connection, such as through a modem, or wirelessly, such as through an access point in communication with one of the routers 142-148. Although only a few computers are depicted in FIG. 1, it should be appreciated that a typical system can include a large number of connected computers, with each different computer being at a different node of the network 150. The network, and intervening nodes, may comprise various configurations and protocols including the Internet, World Wide Web, intranets, virtual private networks, wide area networks, local networks, private networks using communication protocols proprietary to one or more companies, Ethernet, WiFi (such as 802.11, 802.11b, g, n, or other such standards), and HTTP, and various combinations of the foregoing. Such communication may be facilitated by any device capable of transmitting data to and from other computers, such as modems (e.g., dial-up, cable or fiber optic) and wireless interfaces.

According to one aspect of the invention, each TCAM table 112-116 may comprise a set of TCAM entries. A width of the entries in these TCAM tables may be configurable, and inversely proportional to a capacity of the table. For example, a table may support 1000 entries of 72 bits, 512 entries of 144 bits, or 256 entries of 288 bits. Each entry may store a flow rule. The rule includes a key (K), an action (A), and a priority (P). Each rule is stored as a TCAM entry in order of priority. According to one example, highest priority rules may be stored at a lowest indexed entry.

As packets flow from, for example, computer 182 to computer 162, information in the packets is used to determine how the packet should be routed. For example, router 142 may use packet information to determine that the next hop should be router 144, and router 144 receives the packet and determines that the next hop should be router 148. One mechanism used by the routers (e.g., router 144) to make such determinations is the TCAM 110. For example, a header of an incoming packet may include a series of bits, which may be compared against a lookup key of the multi-stage TCAM 110. An output of the TCAM 110 may indicate an action to be taken, directing the packet to the next hop.

In order to maximize TCAM capacity, systems and methods according to one aspect of the present technology provide for efficiently building and populating multi-stage TCAMs, as well as maintaining/updating such multi-stage TCAMs. In addition, the multi-stage TCAM tables may be dynamically configured to minimize their entry width, and therefore maximize capacity.

Figure 2:
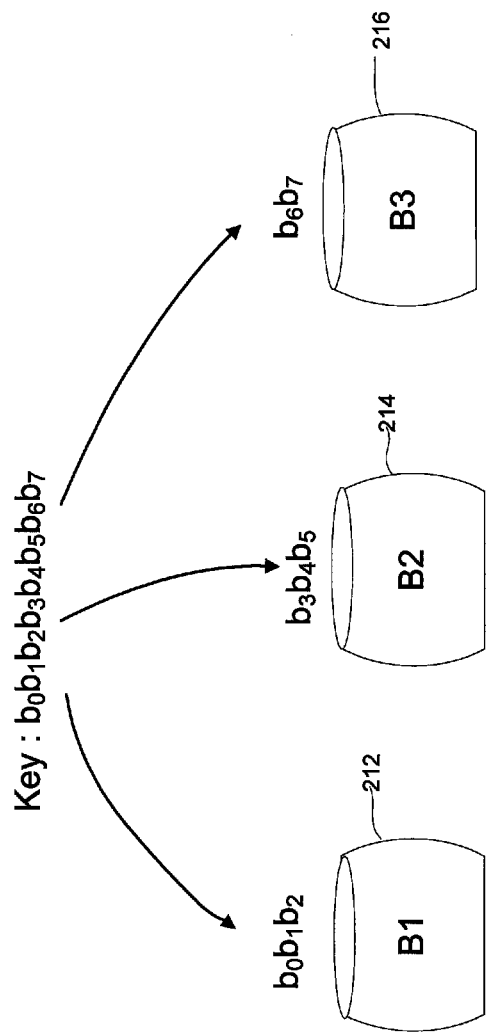
FIG. 2 is a pictorial diagram of flow key buckets according to an aspect of the technology.

FIG. 2 is a pictorial diagram of flow key buckets according to an aspect of the technology. A flow key may be included, for example, in a header of a packet to indicate a destination for the packet. The key includes a number of bits $b_0$-$b_7$. These bits may be grouped into "buckets" B1 (212), B2 (214), and B3 (216). For example, as shown, bits $b_0$-$b_2$ may be grouped in bucket B1, bits $b_3$-$b_5$ may be grouped in bucket B2, and bits $b_6$-$b_7$ may be grouped in bucket B3. It should be understood that any number of buckets 212-216 may be used. Additionally, it should be understood that any number of bits may be assigned to a given bucket. For example, a first bucket may include one bit, while a second bucket includes 5 bits, etc.

Figure 3:
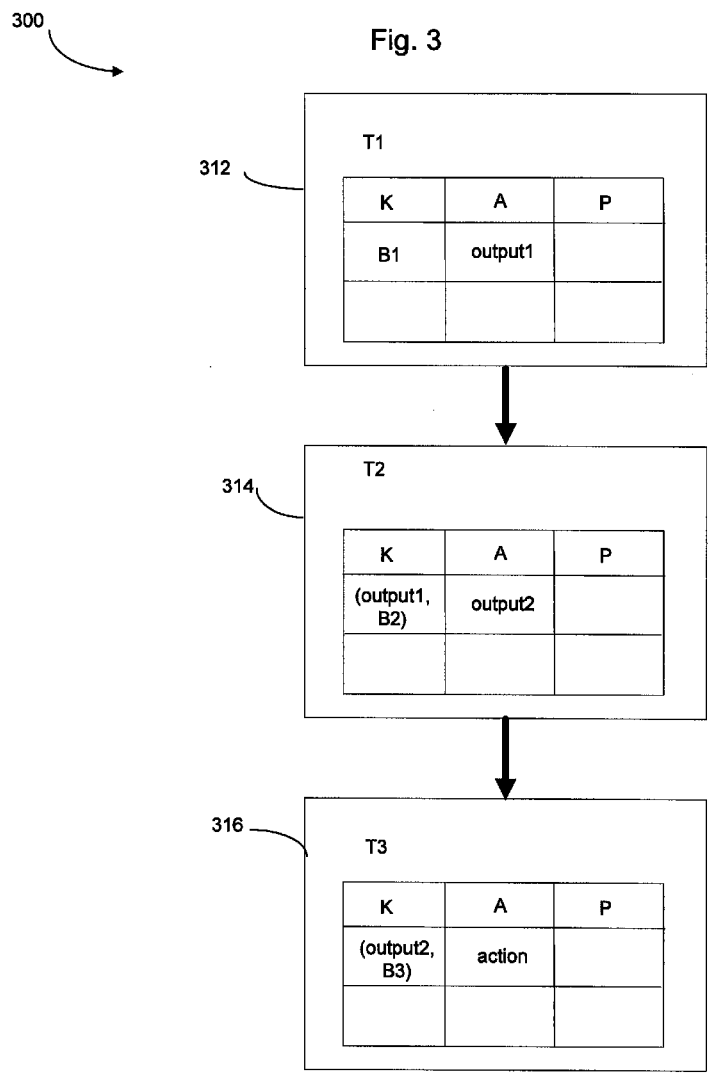
FIG. 3 illustrates a multi-stage TCAM according to an aspect of the technology.

Each bucket may correspond to a table in a multi-stage TCAM. For example, FIG. 3 illustrates a multi-stage TCAM 300 according to an aspect of the technology. The multi-stage TCAM may be located on a router, such as the router 144 of FIG. 1. The multi-stage TCAM 300 includes three tables 312-316, corresponding to each of the buckets 212-216 in FIG. 2. These tables 312-316 may be linked in a pipeline, such that table 314 follows table 312, and table 316 follows table 314.

Each TCAM table 312-316 may be structured as a forwarding table including a key, an action, and a priority. While it should be understood that other structures are possible for the TCAM stages, each stage may be referred to as a "table" hereon for ease of reference, and "stage" and "table" may be used interchangeably herein. The bits in bucket B1 may be listed as a lookup key in the first TCAM stage 312, and a corresponding output (output1) may be listed as the action. The output1 from the first TCAM stage 312 may be used with the bits from the second bucket B2 as a lookup key to the second TCAM stage 314. Thus, for example, the second TCAM stage 314 may include a lookup key (output1, B2), and a corresponding action output2. Similarly, the output from the second TCAM stage 314, along with the third bucket, may be used as a lookup key to the third TCAM stage 316. For example, TCAM stage 316 may list (output2, B3) as a lookup key, with a corresponding action. If the TCAM stage 316 is the last stage in the pipeline, the action may indicate a forwarding behavior for the packet. For example, the action may determine the next hop the packet will travel from the router.

Using a multi-stage TCAM, such as the TCAM 300, may facilitate conservation of resources as compared to a conventional TCAM. For example, because an entire flow key need not be stored as a lookup in the TCAM, a width of the TCAM may be reduced. Because a width of the TCAM may be reduced, a capacity of the TCAM may be increased.

The capacity of the multi-stage TCAM 300 may be maximized if the flow keys are parsed into buckets efficiently. Accordingly, several rules may provide for efficiently parsing the flow keys and creating the multi-stage TCAMs. These rules may be implemented as instructions or software modules executable by the processor 130, or may be used as guidelines for writing such instructions.

Figure 4:
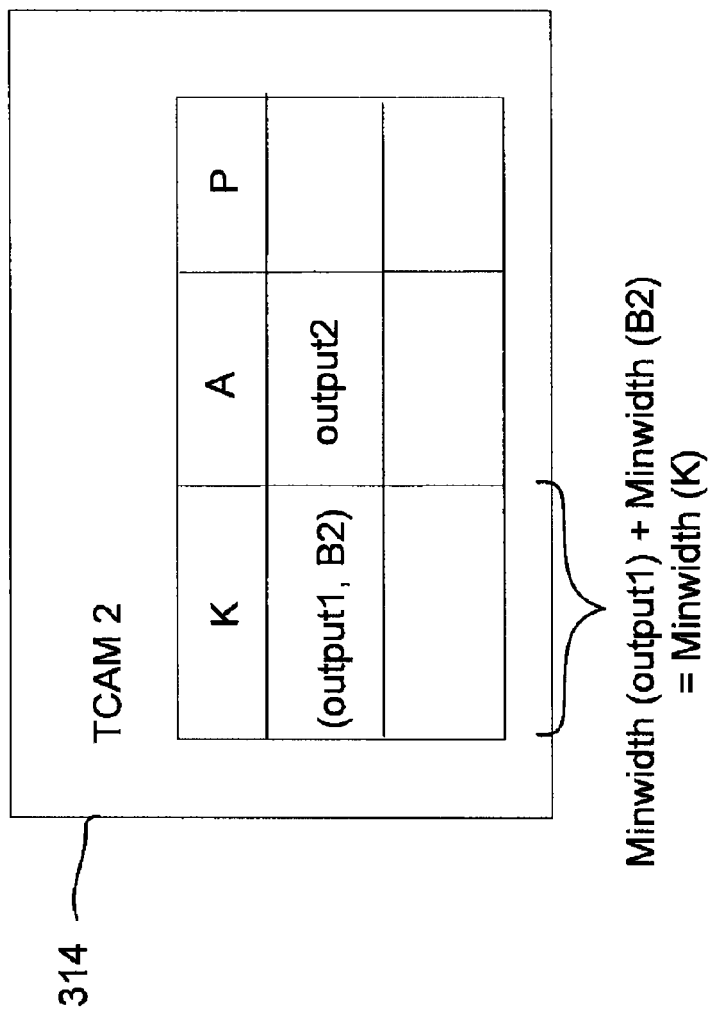
FIG. 4 illustrates a stage of a multi-stage TCAM according to an aspect of the technology.

A first rule is illustrated in FIG. 4, which depicts a stage (e.g., table 314) of a multi-stage TCAM (e.g., TCAM 300). As shown, a lookup key listed in the table 314 is (output1, B2). This key has a given width, for example, determined by a total number of bits therein. The width of the key (output1, B2) may be minimized if the width of output1 and the width of B2 are each minimized. Moreover, if the width of the key (output1, B2) is minimized, a width of the TCAM table 314 may potentially be reduced. For example, if the width of the key (output1, B2) was greater than a width of any other key in the table, reducing the width of the key would enable a reduced width of the entire table. As a further example, if the widths of each of the keys in the table 314 were reduced in a similar manner to the key (output1, B2), the width of the table 314 could also be reduced. In any of these instances of reducing the width of the table 314, the capacity of the table 314 may be increased.

Figure 5:
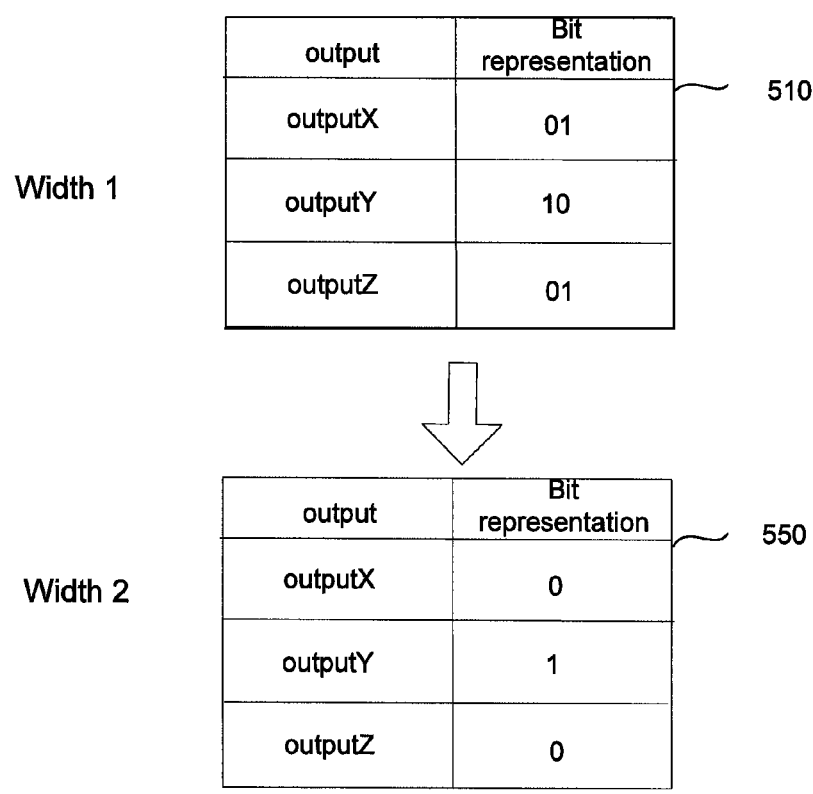
FIG. 5 illustrates reduction of a width of a stage of a multi-stage TCAM according to an aspect of the technology.

A second rule is illustrated in FIG. 5, which depicts reduction of a width of a stage of a multi-stage TCAM according to an aspect of the technology. FIG. 5 shows two tables 510, 550. Each table includes a listing of outputs (e.g., outputX, outputY, outputZ) which may be the outputs corresponding to various lookup keys listed in one stage of a multi-stage TCAM. Each table 510, 550 also includes a bit representation of the output. These bit representations are simplified for ease of explanation. As shown in the table 510, outputX and outputZ are both represented by bits 01, while outputY is represented by bits 10. Because there are effectively only two different outputs (01 and 10), these outputs may be represented by one bit (0 or 1) as shown in table 550.

Figure 6:
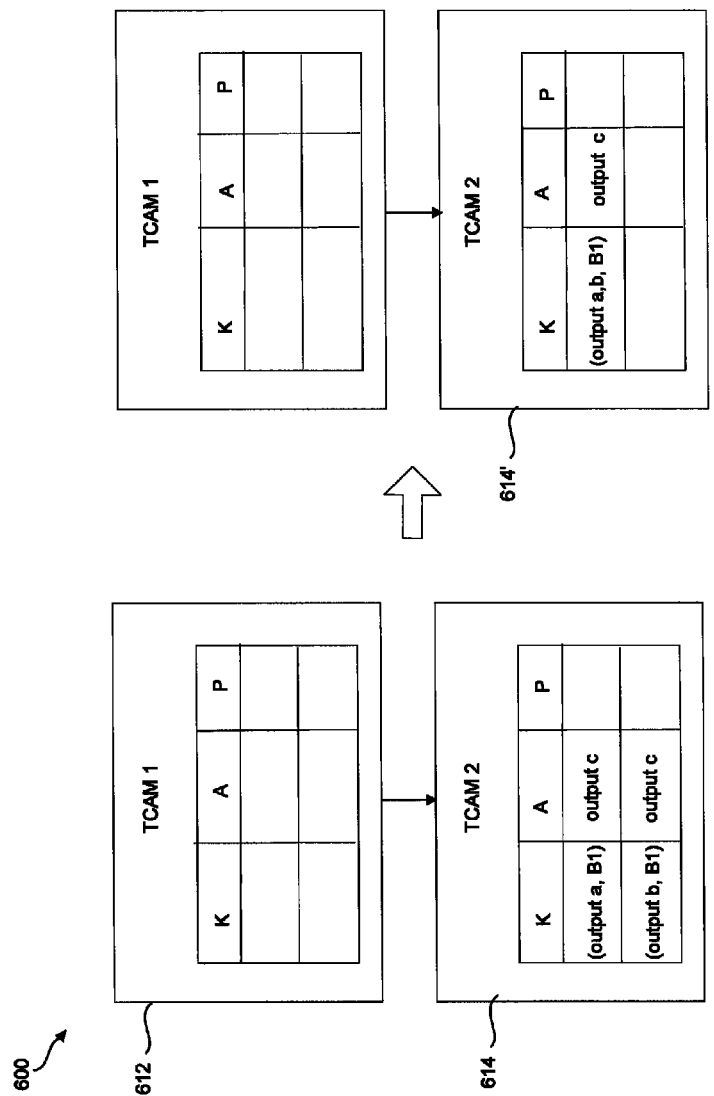
FIG. 6 illustrates a reduction of consumed hardware resources in a stage of a multi-stage TCAM according to an aspect of the technology.

A third rule is illustrated by FIG. 6, which depicts a reduction of consumed hardware resources in a stage of a multi-stage TCAM according to an aspect of the technology. According to this rule, two flow rules having different keys may be aggregated into one flow rule in a router forwarding table if they produce the same output. For example, as shown, a TCAM 600 includes a first stage 612 and a second stage 614. The second stage 614 includes at least two flow rules, comprising lookup keys with corresponding outputs. Although the two lookup keys (output a, B1) and (output b, B1) are different, they correspond to the same output c. These two flow rules may thus be aggregated into a single flow rule. As shown in TCAM stage 614', the two keys of stage 614 are replaced with a single key (output a,b, B1), which corresponds to the output c. In this regard, a capacity of the TCAM 600 is increased by freeing entries in its individual stages.

Based on these rules, minimum widths of the stages in a multi-stage TCAM may be determined, and flow keys may be efficiently parsed into buckets accordingly. For example, according to one aspect of the technology, a minimum width of the last stage in the TCAM may be determined first. Minimum widths of each preceding TCAM stage in the pipeline may then be determined until a width of a first stage in the TCAM is determined. Once the minimal widths of the TCAM stages are determined, a grouping of bits of a flow key into buckets may be determined.

Figure 7:
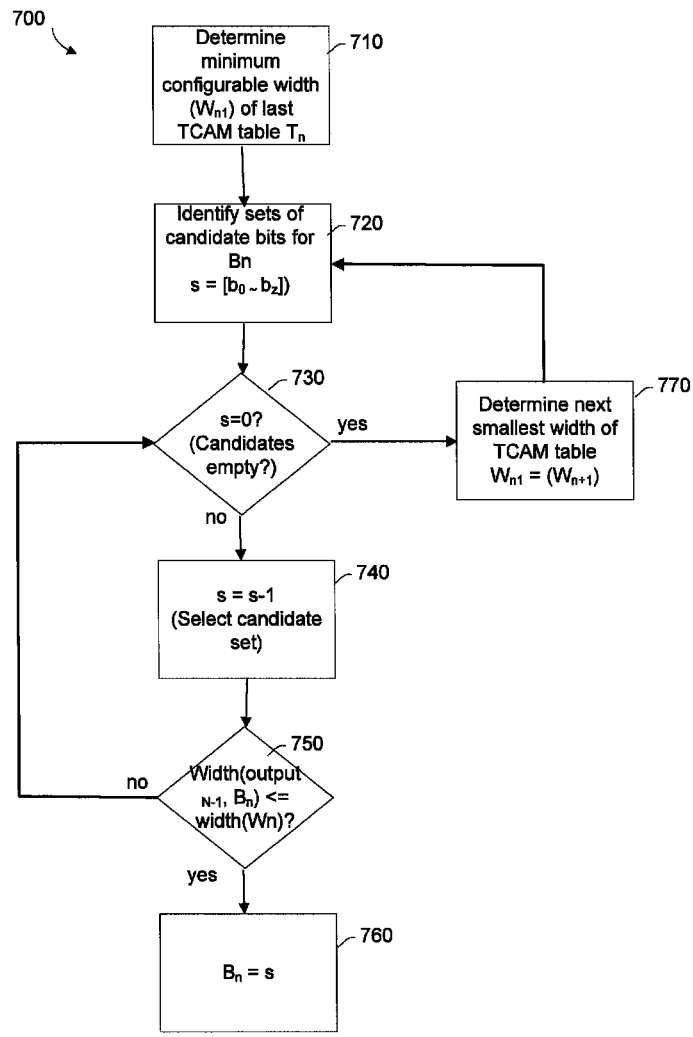
FIG. 7 illustrates a method of minimizing a width of a last stage of a multi-stage TCAM according to an aspect of the technology.

FIG. 7 illustrates a method 700 of minimizing the width of the last table in a multi-stage TCAM according to an aspect of the technology. To achieve this, a minimum width ($W_{n1}$) of the table ($T_n$) may be determined. It is then determined whether a bucket ($B_n$), which corresponds to the last stage, exists such that a total width of a lookup key in the last stage is less than or equal to the determined minimum width of the table. If no such bucket exists, a next smallest configurable width for the last table is determined, and a similar analysis is performed. This process is explained in further detail below.

In block 710, a TCAM stage's minimum configurable width ($W_{n1}$) is determined. For example, the minimum configurable width may be set by a manufacturer and read by a processor in communication with the TCAM.

In block 720, a set of candidate bits to be grouped into a last bucket $B_n$, corresponding to the last table $T_n$ of the TCAM, is identified. For example, the candidate bits may include all or some of the bits of a flow key, such as the last four bits as a first set, the last three bits as a second set, the last two bits as a third set, etc. According to one example, the candidate sets of bits for the bucket $B_n$ may be defined as $s=(b_0\text{-}b_z)$, where $b_0\text{-}b_z$ represent all bits in the flow key.

In block 730, it may be determined whether the candidate sets of bits are empty. For example, if all the candidate sets of bits have been analyzed, $s=0$ may return true. However, if there are candidate sets that have not yet been analyzed, a set may be selected in block 740 and removed from the candidate sets.

In block 750, it is determined whether a total width of (output$_{n-1}$, $B_n$) is less than or equal to the minimum configurable width $W_{n1}$, where the selected candidate set of bits is used for $B_n$. If this returns true, $B_n$ is set to the selected candidate set of bits (block 760).

However, if the condition of block 750 returns false, the method 700 returns to block 730, where it is determined whether the any candidate sets of bits remain for analysis and another candidate set is selected for analysis (block 740).

If all the candidate sets of bits have been analyzed, and none of the candidate values for $B_n$ have a width that, when combined with the width of output$_{n-1}$, are smaller than or equal to the minimum configurable width $W_{n1}$ of the table, a next smallest possible width of the TCAM stage is determined (block 770). Accordingly, the process of identifying candidate sets of bits and determining whether any of the sets of bits, when grouped in the last bucket $B_n$, satisfy the condition (output$_{n-1}$, $B_n$)<=$W_{n1}$, where $W_{n1}$ is now the next smallest configurable width of the table $T_n$. The method 700 may continue this progression of analyzing candidate sets of bits for the bucket $B_n$ for each possible width of the table $T_n$ greater than the minimum configurable width until a value for $B_n$ is identified.

Figure 8:
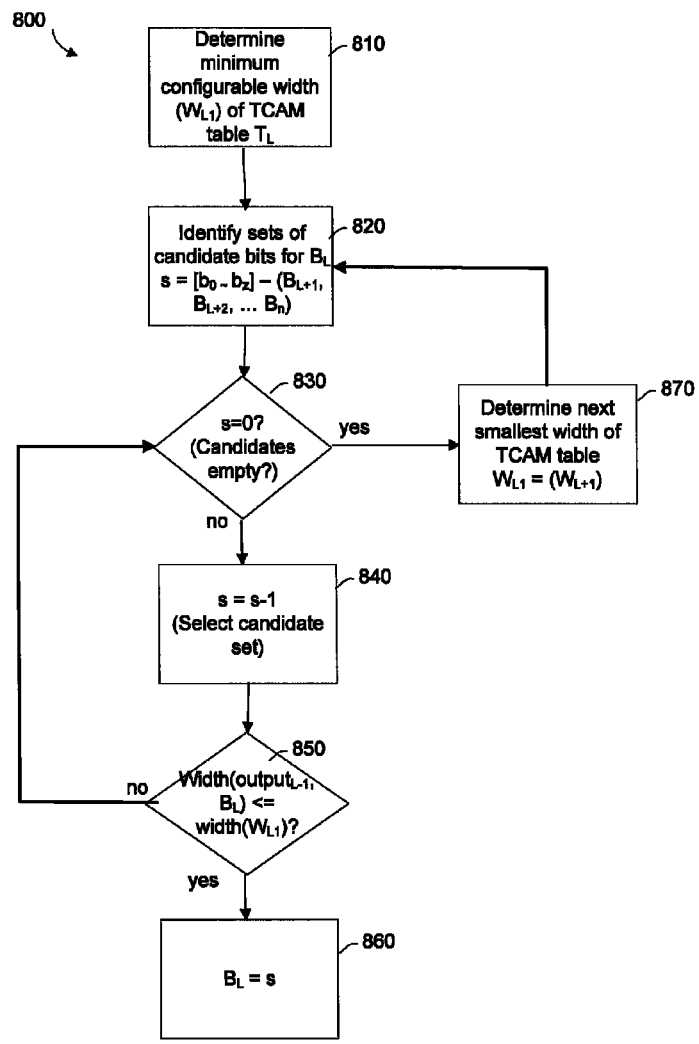
FIG. 8 illustrates a method of minimizing a width of a preceding stage of a multi-stage TCAM according to an aspect of the technology.

Buckets for each TCAM table preceding the last table $T_n$ may be consecutively determined in a manner similar to the method 700. For example, bucket $B_{n-1}$ may be determined for a minimum width of table $T_{n-1}$, bucket $B_{n-2}$ may be determined for a minimum width of table $T_{n-2}$, and so on. A method 800 of determining the bucket ($B_L$) and minimum width (W) of a TCAM stage table ($T_L$) preceding the last table in the pipeline is illustrated in FIG. 8. This method 800 may be performed, for example, after determining the widths of $T_{L+1}, T_{L+2}, \ldots T_N$.

In block 810, a minimum configurable width ($W_L$) of a TCAM table $T_L$ is determined. For example, the minimum configurable width may be determined in a manner similar to that described above in connection with block 710 of FIG. 7.

In block 820, a set of candidate bits to be grouped into a bucket $B_L$, corresponding to the table $T_2$, is identified. In contrast to the block 720 of FIG. 7, however, the candidate sets of bits may include only those bits which have not been already assigned to buckets $B_{L+1}$, $B_{L+2}$, etc., corresponding to TCAM tables $T_{L+1}$, $T_{L+2}$, etc. For example, if the table $T_L$ immediately precedes the last table $T_N$ in the pipeline, and the last 3 bits of an 8-bit key are assigned to the bucket $B_N$, only sets of bits including the first five bits of the key may be identified as candidates for $B_L$. According to one example, the candidate sets of bits for the bucket $B_L$ may be defined as $s=(b_0\text{~}b_z)-(B_{L+1}, B_{L+2}, \ldots B_N)$, where $b_0\text{~}b_z$ represent all bits in the flow key, and ($B_{L+1}, B_{L+2}, \ldots B_N$) represent the bits already grouped into buckets for subsequent tables in the pipeline.

In block 830, it may be determined whether the candidate sets of bits are empty. For example, if all the candidate sets of bits have been analyzed, $s=0$ may return true. However, if there are candidate sets that have not yet been analyzed, a set may be selected in block 840 and removed from the candidate sets.

In block 850, it is determined whether a total width of (output$_{L-1}$, $B_L$) is less than or equal to the minimum configurable width $W_{L1}$, where the selected candidate set of bits is used for $B_L$. If this returns true, $B_L$ is set to the selected candidate set of bits (block 860). However, if the condition of block 850 returns false, the method 800 returns to block 830, where it is determined whether any candidate sets of bits remain for analysis, and if so, another candidate set is selected for analysis (block 840).

If all the candidate sets of bits have been analyzed, and none of the candidate values for $B_L$ have a width that, when combined with the width of output$_{L-1}$, are smaller than or equal to the minimum configurable width $W_{L1}$ of the TCAM stage, a next smallest possible width of the table $T_L$ is determined (block 870). Accordingly, the process of identifying candidate sets of bits and determining whether any of the sets of bits, when grouped in the bucket $B_L$, satisfy the condition (output$_{L-1}$, $B_L$)<=$W_{L1}$, where $W_{L1}$ is now the next smallest width of the table $T_L$. The method 800 may continue this progression of analyzing candidate sets of bits for the bucket $B_L$ for each possible width of the table $T_L$ greater than the minimum configurable width until a value for $B_L$ is identified.

Periodically, the multi-stage TCAM may need to be updated, for example, to add a flow rule or delete a flow rule. To maintain efficiency of the multi-stage TCAM (e.g., to maximize capacity and minimize width of each table to the extent possible), rules may be added or deleted according to a given method.

FIG. 9 illustrates an example method 900 of adding a rule to a multi-stage TCAM according to an aspect of the technology. The multi-stage TCAM may include tables $T_1$, $T_2, \ldots T_n$. Widths of each of these tables and a number of bits in each corresponding bucket $B_1, B_2, \ldots B_n$ may have been determined, for example, according to the methods 700 and 800 of FIGS. 7-8.

In block 910, a rule to be added to the multi-stage TCAM is identified. The rule may include a key, an action, and a priority.

In block 920, the key of the rule may be parsed into buckets based on existing buckets $B_1, B_2, \ldots B_n$ corresponding to table stages $T_1, T_2, \ldots T_n$. For example, if there are three stages in the pipeline ($T_1, T_2, T_3$) and each of buckets $B_1, B_2, B_3$ includes 3 bits, the lookup key of the rule to be added may be parsed to group the first three bits in $B_1$, the next three bits in $B_2$, and the last three bits in $B_3$. It should be understood that the number of buckets and the number of bits assigned to each bucket are merely exemplary, and that lookup keys may be longer or shorter than 9 bits and that more or fewer buckets or bits per bucket may be designated.

In block 930, a first table $T_1$ in the multi-stage TCAM is selected. The table $T_1$ may be, for example, the first or last table in the pipeline. This table $T_1$ may be defined as T for purposes of the remaining blocks in the method 900.

In block 940, a lookup key and action for the new rule may be determined for the table T. For example, if table T is the first table in the pipeline, the lookup key may be $B_1$ and the action may be output1. If table T is not the first table in the pipeline (e.g., $T_L$), the lookup key may be (output$_{L-1}$, $B_L$) and the action may be output$_L$.

In block 950, it may be determined whether the table T includes a lookup key and action that would render the new rule's lookup key and action redundant. For example, the lookup key for the new rule may be "100" and the action may be "11." If another rule in the table T includes lookup key "100" and action "11," the new rule may be considered redundant for table T.

If the new rule is determined to be redundant for table T, no new entry is created in the table T. The method 900 proceeds to block 980, where T is defined as a next table in the pipeline (e.g., $T_2$), and the method repeats from block 940 to determine whether a new entry need be created in that next table.

If the new rule is determined to not be redundant, however, a new entry for the rule may be created in the table T (block 960). The new rule's lookup key and action for the table T may thus be added in the new entry (block 970). The next table may then be analyzed to determine whether a new entry need be created, and this process may iterate until all the tables in the pipeline have been analyzed.

FIG. 10 illustrates a method 1000 for deleting a rule from the multi-stage TCAM according to an aspect of the technology. Similar to the method 900 of FIG. 9, the method 1000 visits each table $T_1, T_2, \ldots T_n$ of the multi-stage TCAM. However, rather than determining whether new entries need be created, the method 1000 determines whether entries may be deleted.

In block 1010, a rule (e.g., rule "r") to be removed is identified. The rule r may include a key and an action. In block 1020, a first table of the multi-stage TCAM is selected. For example, a first table $T_1$ in the pipeline may be selected first and defined as T for purposes of the remainder of the method 1000.

In block 1030, a lookup and action for the rule r is identified in the table T. For example, if table T is the first table in the pipeline, the lookup key may be $B_1$ and the action may be output$_1$. If table T is not the first table in the pipeline (e.g., $T_L$), the lookup key may be (output$_{L-1}$, $B_L$) and the action may be output$_L$.

In block 1040, it may be determined whether the rule r shares its lookup key and action with any other rules in table T that are not to be removed. For example, to minimize consumption of resources, two flow rules may have been aggregated into one table entry, as explained above in connection with the third rule (FIG. 6). If such is the case, no action may be taken with respect to the entries in table T, and a next table in the pipeline may be selected in block 1060. If, however, the rule r does not share its lookup key and action with any other rule in the table T, the entry for the lookup and action for the rule r may be deleted from the table T (block 1050). This process of determining whether the rule r shares its lookup key and action may be reiterated for each table in the multistage.

It should be understood that the operations involved in the above methods need not be performed in the precise order described. Rather, various operations may be handled in a different order or simultaneously, and operations may be added or omitted.

The above described methods may be implemented as software (e.g., executable code stored in memory 120) and executed by a processor in the router. Alternatively, the software may be stored remotely. This software application may be automatically run, for example, each time a flow rule is to be added to or removed from the router.

The above-described methods may produce a significant cost savings. Particularly, less hardware resources may be consumed, because the TCAMs are used more efficiently. Further, because the width and capacity of each TCAM may be automatically configured, updating of the router to add or delete rules may be done quickly and efficiently.

Although the present invention has been described with reference to particular embodiments, it should be understood that these examples are merely illustrative of the principles and applications of the present invention. For example, it should be understood that the described system and method may be implemented over any network, such as the Internet, or any private network connected through a router. For example, the network may be a virtual private network operating over the Internet, a local area network, or a wide area network. Additionally, it should be understood that numerous other modifications may be made to the illustrative embodiments. For example, the steps taken to derive the lowest cost number of moves within the TCAM may be modified. However, these and that other arrangements may be devised without departing from the spirit and scope of the present invention as defined by the appended claims.

The invention claimed is:

1. A method for routing a data packet received at a router, comprising:
    accessing a multi-stage forwarding table in memory, the multi-stage forwarding table including a plurality of tables linked in a pipeline, each table of the plurality of tables including a plurality of entries, and each entry includes a lookup key and a corresponding output;
    wherein:
        respective lookup keys of entries of a first table of the plurality of tables include bits from flow keys selected from a first set of flow key bit positions belonging to a plurality of sets of flow key bit positions,
        respective lookup keys of entries in each of at least one remaining table of the plurality of tables include the output of an entry of an immediately preceding table and bits from flow keys selected from respective corresponding additional sets of flow key bit positions belonging to the plurality of sets of flow key bit positions,
        respective outputs in the entries of a last table of the plurality of tables include respective actions for forwarding a data packet,
        each set of flow key bit positions includes bit positions that do not overlap with bit positions in any other set of flow key bit positions belonging to the plurality of sets of flow key bit positions;
    receiving a data packet at an input port of the router, the data packet including routing information of the data packet;
    obtaining a received data packet flow key based on the routing information included in the received data packet;

matching bits in the first set of flow key bit positions in the received data packet flow key to a lookup key in the first table of the plurality of tables;

sequentially for each remaining table:
  matching a combination of bits in a corresponding set of flow key bit positions in the received data packet flow key and an output from an entry in an immediately preceding table with lookup keys of entries in the respective table to determine a respective output; and
routing the data packet based on forwarding information included in determined output of the last table.

2. The method of claim 1, further comprising reducing a width of at least one table of the plurality of tables.

3. The method of claim 2, wherein reducing a width of at least one table of the plurality of tables includes reducing a width of one of the remaining tables of the plurality of tables by reducing a width of an output in an entry of the immediately preceding table, and reducing a width of the lookup key in an entry in the one of the remaining tables that includes the output of the immediately preceding table.

4. The method of claim 2, wherein reducing the width of at least one table of the plurality of tables includes reducing a number of outputs in the at least one table of the plurality of tables, and reducing a number of bits used to represent a reduced number of outputs in the at least one table.

5. The method of claim 2, wherein reducing the width of at least one table of the plurality of tables includes aggregating two or more different lookup keys having a same output into a single lookup key.

6. The method of claim 1, further comprising:
determining a minimum configurable width of the last table of the plurality of tables;
setting a configurable width of the last table of the plurality of tables to the minimum configurable width;
identifying candidate sets of flow key bit positions;
determining a first candidate set of flow key bit positions from the candidate sets of flow key bit positions such that a first sum of a width of the first candidate set of flow key bit positions and a width of an output from an immediately preceding table is less than the configurable width of the last table of the plurality of tables;
using the first candidate set of flow key bit positions as the set of flow key bit positions corresponding to the last table of the plurality of tables.

7. The method of claim 6, further comprising, if the first candidate set of flow key bit positions cannot be determined for the configurable width that is set to the minimum configurable width of the last table:
repeatedly increasing the configurable width of the last table of the plurality of tables until one candidate set of flow key bit positions, from the candidate sets of flow key bit positions, can be determined such that a sum of a width of the one candidate set of flow key bit positions and a width of an output from the immediately preceding table is less than a current configurable width of the last table.

8. The method of claim 6, further comprising:
determining a minimum configurable width of a second table of the plurality of tables, the second table immediately preceding the last table of the plurality of tables;
excluding the first candidate set of flow key bits from the candidate sets of flow key bits to create a remainder candidate sets of flow key bits;
determining a second candidate set of flow key bit positions from the remainder candidate sets of flow key bit positions such that a second sum of a width of the second candidate set of flow key bit positions and a width of an output from an immediately preceding table is less than the minimum configurable width of the second table of the plurality of tables; and
using the second candidate set of flow key bit positions as the set of flow key bit positions corresponding to the second table of the plurality of tables.

9. The method of claim 1, further comprising:
identifying a new rule to be added to the multi-stage forwarding table, the new rule including a new flow key and a new action;
dividing the new flow key into a plurality of proposed lookup key bits, each of the plurality of proposed lookup key bits including bits from the new flow key selected from a corresponding set of flow key bit positions of the plurality of sets of flow key bit positions;
for each of the plurality of tables:
  creating a new entry having a new lookup key and a new output, the new lookup key including the respective proposed lookup key bits, if the respective proposed lookup key bits are not found in a lookup key in any of the respective entries,
wherein creating a new entry in the last table of the plurality of tables includes storing the new action included in the new rule as the new output of the new entry in the last table.

10. The method of claim 1, further comprising:
identifying a rule to be deleted from the multi-stage forwarding table, the rule including candidate flow key and a candidate action;
dividing the candidate flow key into a plurality of proposed lookup key bits, each of the plurality of proposed lookup key bits including bits from the candidate flow key selected from respective corresponding set of flow key bit positions;
for each of the plurality of tables:
  identifying an entry having a lookup key that includes the respective proposed lookup key bits;
  deleting the identified entry if the lookup key of the identified entry is not shared with another rule.

11. A network router comprising:
a memory storing a multi-stage forwarding table, the multi-stage forwarding table including a plurality of tables linked in a pipeline, each table of the plurality of tables including a plurality of entries, and each entry including a lookup key and a corresponding output, wherein:
respective lookup keys of entries of a first table of the plurality of tables include bits from flow keys selected from a first set of flow key bit positions belonging to a plurality of sets of flow key bit positions,
respective lookup keys of the entries in each of the remaining tables of the plurality of tables include the output of an entry of an immediately preceding table and bits from flow keys selected from respective corresponding additional sets of flow key bit positions belonging to the plurality of sets of flow key bit positions,
respective outputs in the entries of a last table of the plurality of tables include respective actions for forwarding a data packet, and
each set of flow key bit positions includes bit positions that do not overlap with bit positions in any other set of flow key bit positions belonging to the plurality of sets of flow key bit positions;

an input port configured to receive a data packet from a network, the data packet including routing information; and a processor coupled to the memory and to the input port configured to:
  obtain a received data packet flow key based on the routing information included in the received data packet;
  match bits in the first set of flow key bit positions in the received data packet flow key to a lookup key in the first table of the plurality of tables;
  sequentially for each remaining table:
    match a combination of bits in a corresponding set of flow key bit positions in the received data packet flow key and an output from an entry in an immediately preceding table with lookup keys of entries in the respective table to determine a respective output; and
  route the data packet based on forwarding information included in determined output of the last table.

12. The router of claim 11, wherein the processor is further configured to reduce a width of at least one table of the plurality of tables.

13. The router of claim 12, wherein the processor is further configured to reduce a width of one of the remaining tables of the plurality of tables by reducing a width of an output in an entry of the immediately preceding table, and reducing a width of the lookup key in an entry in the one of the remaining tables that includes the output of the immediately preceding table.

14. The router of claim 12, wherein the processor is further configured to reduce a number of outputs in the at least one table of the plurality of tables, and reduce a number of bits used to represent a reduced number of outputs in the at least one table.

15. The router of claim 12, wherein the processor is further configured to aggregate two or more different lookup keys having a same output into a single lookup key.

16. The router of claim 11, wherein the processor is further configured to:
  determine a minimum configurable width of the last table of the plurality of tables;
  set a configurable width of the last table of the plurality of tables to the minimum configurable width;
  identify candidate sets of flow key bit positions;
  determine a first candidate set of flow key bit positions from the candidate sets of flow key bit positions such that a first sum of a width of the first candidate set of flow key bit positions and a width of an output from an immediately preceding table is less than the configurable width of the last table of the plurality of tables;
  use the first candidate set of flow key bit positions as the set of flow key bit positions corresponding to the last table of the plurality of tables.

17. The router of claim 16, wherein the processor is further configured to, if the first candidate set of flow key bit positions cannot be determined for the configurable width that is set to the minimum configurable width of the last table:
  repeatedly increase the configurable width of the last table of the plurality of tables until one candidate set of flow key bit positions, from the candidate sets of flow key bit positions, can be determined such that a sum of a width of the one candidate set of flow key bit positions and a width of an output from the immediately preceding table is less than a current configurable width of the last table.

18. The router of claim 16, wherein the processor is further configured to:
  determine a minimum configurable width of a second table of the plurality of tables, the second table immediately preceding the last table of the plurality of tables;
  exclude the first candidate set of flow key bits from the candidate sets of flow key bits to create a remainder candidate sets of flow key bits;
  determine a second candidate set of flow key bit positions from the remainder candidate sets of flow key bit positions such that a second sum of a width of the second candidate set of flow key bit positions and a width of an output from an immediately preceding table is less than the minimum configurable width of the second table of the plurality of tables; and
  use the second candidate set of flow key bit positions as the set of flow key bit positions corresponding to the second table of the plurality of tables.

19. The router of claim 11, wherein the processor is further configured to:
  identify a new rule to be added to the multi-stage forwarding table, the new rule including a new flow key and a new action;
  divide the new flow key into a plurality of proposed lookup key bits, each of the plurality of proposed lookup key bits including bits from the new flow key selected from a corresponding set of flow key bit positions of the plurality of sets of flow key bit positions;
  for each of the plurality of tables:
    create a new entry having a new lookup key and a new output, the new lookup key including the respective proposed lookup key bits, if the respective proposed lookup key bits are not found in a lookup key in any of the respective entries,
    wherein creating a new entry in the last table of the plurality of tables includes storing the new action included in the new rule as the new output of the new entry in the last table.

20. The router of claim 11, wherein the processor is further configured to:
  identify a rule to be deleted from the multi-stage forwarding table, the rule including a candidate flow key and a candidate action;
  divide the candidate flow key into a plurality of proposed lookup key bits, each of the plurality of proposed lookup key bits including bits from the candidate flow key selected from a corresponding set of flow key bit positions of the plurality of sets of flow key bit positions;
  for each of the plurality of tables:
    identify an entry having a lookup key that includes the respective proposed lookup key bits, and
    delete the identified entry if the lookup key of the identified entry is not shared with another rule.

21. The router of claim 11, wherein the memory is a tertiary content addressable memory (TCAM).

* * * * *